(12) United States Patent
Grard et al.

(10) Patent No.: US 11,102,936 B2
(45) Date of Patent: Aug. 31, 2021

(54) NURSERY FRUIT TREE OF AT LEAST DOUBLE TRUNK TYPE

(71) Applicant: GRADILIS RECHERCHE SARL, Mudaison (FR)

(72) Inventors: Olivier Grard, Mudaison (FR); Thibault Vasseur, St Just (FR)

(73) Assignee: Gradelis Recherche SARL, Mudaison (FR)

( * ) Notice: Subject to any disclaimer, the term of this patent is extended or adjusted under 35 U.S.C. 154(b) by 0 days.

(21) Appl. No.: 16/647,811

(22) PCT Filed: Sep. 18, 2018

(86) PCT No.: PCT/EP2018/075129
§ 371 (c)(1),
(2) Date: Mar. 16, 2020

(87) PCT Pub. No.: WO2019/053277
PCT Pub. Date: Mar. 21, 2019

(65) Prior Publication Data
US 2020/0275612 A1    Sep. 3, 2020

(30) Foreign Application Priority Data

Sep. 18, 2017   (EP) .................................. 17290119

(51) Int. Cl.
*A01G 2/30*    (2018.01)
(52) U.S. Cl.
CPC ...................................... *A01G 2/30* (2018.02)

(58) Field of Classification Search
CPC ........................................................ A01G 2/30
See application file for complete search history.

(56) References Cited

U.S. PATENT DOCUMENTS

2004/0268450 A1* 12/2004 Kanda ................... A01G 2/30
800/323

FOREIGN PATENT DOCUMENTS

| CN | 103704031 B | 4/2014 | |
| WO | 2008047297 A2 | 4/2008 | |
| WO | 2012062672 A1 | 5/2012 | |
| WO | WO-2012062672 A1 * | 5/2012 | ............... A01G 2/30 |

OTHER PUBLICATIONS

"Grow Great Fruit" Jun. 10, 2016 (Retrieved from the Internet Mar. 10, 2021) https://growgreatfruit.com/are-multigraft-fruit-trees-a-good-idea/).*
https://www.canr.msu.edu/news/selecting_and_storing_scion_wood_for_grafting (Retrieved from the Internet on Mar. 23, 2021)(6 pages total).*
Santos et al. "Sweet cherry (*Prunus avium*) growth is mostly affected by rootstock and much less by budding height," New Zealand Journal of Crop and Horticultural Science, 2004, vol. 32:309-318.*

(Continued)

*Primary Examiner* — Susan McCormick Ewoldt
(74) *Attorney, Agent, or Firm* — Patent Law Works LLP

(57) ABSTRACT

The present invention provides a method for producing a nursery fruit tree of at least double trunk type. The invention also provides a nursery fruit tree of at least double trunk type, ready for sale to growers to plant in an orchard.

17 Claims, 1 Drawing Sheet

(56) References Cited

OTHER PUBLICATIONS

PCT International Preliminary Reporton Patentability, Application No. PCT/EP2018/075129 Gradilis Recherche SARL, International filing date of Sep. 18, 2018, Authorized Officer Van den Heuvel, M., dated Feb. 12, 2019, 17 pgs.
PCT International Search Report and Written Opinion; Application No. PCT/EP2018/075129, Gradilis Recherche SARL, filing date of Sep. 18, 2018, dated Dec. 4, 2018, 9 pages.

* cited by examiner

NURSERY FRUIT TREE OF AT LEAST DOUBLE TRUNK TYPE

FIELD OF THE INVENTION

The present invention is situated in the field of horticultural methods of obtaining productive fruit trees, more in particular methods for making nursery fruit trees of the double or multiple trunk type, and such nursery fruit trees and orchard fruit trees developing therefrom as such.

BACKGROUND OF THE INVENTION

In the field of industrial fruit growing, growers buy young trees from tree nurseries (nursery trees) for planting or re-planting orchards. It is of the utmost importance to develop nursery trees that have a maximum fruit-bearing capacity at the start of their growth in the orchard, which will be maintained during the life of the tree (typically 10 or more years).

Fruit nursery trees for commercial fruit production traditionally consist of a rootstock onto which a scion is grafted or budded (sometimes, also a so-called 'interstem' is placed between the rootstock and the scion, particularly when graft-incompatibility between rootstock and scion is suspected). The rootstock interacts with the soil and influences the tolerance of the tree against biotic and abiotic stress factors as well as its growth habitus and the fruit quality. The scion consists of the variety with the desired fruit characteristics. Several horticultural methodologies for producing fruit nursery trees are known in the art and traditionally use intervention onto the tree structure by for instance pruning or the application of hormones.

An often used fruit nursery tree type is the so-called "knip tree". The single-trunk knip tree is a two-year old fruit tree with a one-year-old crown. The term 'knip' (Dutch for 'cut') stems from the cutting of the tree after one year at about 50 to 80 cm above the ground, depending on the variety. In the next year, the top bud is promoted to create a central leader on which sylleptic shoots will form branches which will bear the fruit, having an implantation angle of almost 90° with respect to the central leader.

When compared to knip trees, fruit trees of the double trunk type (bicaulis plants) are becoming more widespread as they have some advantages in the production of orchards. For instance, fruit trees of the double trunk type require lower planting densities (roughly half of the density of single trunk tree orchards) to achieve similar fruit productions. Furthermore, lack of a dominant leader branch reduces the vigour in fruit trees of the double trunk type and hence the need for corrective pruning throughout the orchard lifetime. Also, fruit trees of the double trunk type bring a gain of time when harvesting.

WO 2008/047297 describes a method for producing fruit tree plants of double trunk type. The method comprises a) transplanting a rootstock in soil for cultivation, and cultivation thereof; b) grafting onto the rootstock propagating material of the variety to be reproduced for producing shoots; c) selecting and/or modifying the position of the shoots with the aim of obtaining two shoots placed opposite each other on each one of the plants; and d) cultivating the plants until the stadium wherein they can be planted out for the fruit production. Although this method aims to obtain two homogenous and symmetric scions on one single root, the two shoots may develop unevenly due to poor establishment of two scions on a single rootstock, resulting in a lower yield of fruit on one of the two scions, and hence a lower overall yield of the orchard.

The goal of the present invention is to provide nursery trees of the double trunk type as starting material for establishing fruit production orchards, such nursery fruit trees overcoming the drawbacks of the known fruit nursery trees of the double trunk type in terms of productivity in the orchard.

SUMMARY OF THE INVENTION

The present inventors realised that a nursery fruit tree comprising a branched rootstock containing at least two branches, each branch independently grafted with a scion, advantageously allows balanced development of the at least two scions, leading to similar and high fruit yields on both scion branches and consequently to a high overall fruit yield of the orchard.

Accordingly, a first aspect of the invention relates to a nursery fruit tree of at least double trunk type, wherein the nursery fruit tree comprises a branched rootstock containing at least two branches, each branch grafted with a scion.

A related aspect provides a fruit tree grown from the nursery fruit tree as defined herein.

A further aspect of the invention relates to a method for producing a nursery fruit tree of at least double trunk type, comprising the steps of:

(a) providing a rootstock;
(b) producing a branched rootstock containing at least two branches, and
(c) grafting a scion on each branch of the branched rootstock, thereby obtaining a nursery fruit tree of at least double trunk type.

A related aspect provides a nursery fruit tree obtainable by the method as defined herein.

Nursery fruit trees according to the present invention, fruit trees grown from said nursery fruit trees, methods according to the present invention, and nursery fruit trees obtainable by said methods have several potential advantages over (nursery) fruit trees and methods existing in the art, as outlined in Table 1 below.

TABLE 1

Advantages in the nursery of the method according to the invention for producing a nursery fruit tree of at least double trunk type and advantages in the orchard of the nursery fruit tree of at least double trunk type according to the invention, and comparison with prior art trees and methods for their production

| Prior art single leader tree (e.g. knip tree) | Prior art fruit tree plant of the double trunk type with an unbranched rootstock (e.g. as in WO 2008/047297) | Nursery fruit tree according to the invention |
| --- | --- | --- |
| Method for producing a nursery fruit tree ||| 
| | Sometimes economically unacceptable losses due to poor establishment of scion- | Less losses, more trees survive due to efficient scion-rootstock connection |

TABLE 1-continued

Advantages in the nursery of the method according to the invention for producing a nursery fruit tree of at least double trunk type and advantages in the orchard of the nursery fruit tree of at least double trunk type according to the invention, and comparison with prior art trees and methods for their production

| Prior art single leader tree (e.g. knip tree) | Prior art fruit tree plant of the double trunk type with an unbranched rootstock (e.g. as in WO 2008/047297) | Nursery fruit tree according to the invention |
| --- | --- | --- |
| | rootstock connections because two scion buds have to be established on a single rootstock branch | establishment because only one scion bud needs to be established on each rootstock branch |
| | Lower success rates compared to success rates of production of single scion trees like knip trees | Success rates are comparable to success rates of production of single scion trees like knip trees |
| | Often reduced calibre and/or length of the branches of a tree due to the often poor establishment of two scions on a single rootstock | Higher branch calibre and/or length due to efficient establishment of grafts on each rootstock branch |
| | Reduced income for the tree nursery because fruit growers pay less for trees with lower branch calibres and/or lengths | Increased income for the tree nursery because fruit growers pay more for trees with higher branch calibres and/or lengths |
| Dominant single leader branch requires severe pruning and/or hormone treatment to induce the formation of (proleptic) side branches of the required length and position | | The lack of a dominant leader branch facilitates the formation of sylleptic side branches with the desired architecture |
| | Success rates depend significantly on the scion variety | Success rates are similar for different scion varieties |
| Random use of rootstocks of which a part will perform sub-optimally in tree establishment | Random use of rootstocks of which a part will perform sub-optimally in tree establishment | Inherent selection for rootstocks of better quality because only strong rootstocks will produce two or more branches when cut back |
| If a scion dies during production, the tree is lost | | If one scion dies during production, the remaining tree becomes a single-scion tree that can be sold |
| Nursery fruit tree in the orchard | | |
| | Often uneven development of the two scion branches of a tree, resulting in a lower yield of fruit on one of the two scion branches, and subsequently a lower overall yield of the orchard | Balanced development of the at least two scion branches of one tree, leading to similar and high fruit yields on both scion branches and consequently a high overall yield of the orchard |
| | Often uneven development of the two scion branches of one tree, resulting in fruit of different size and quality between the scion branches and consequently a more heterogeneous harvest and a lower income for the grower | Balanced development of the at least two scion branches of one tree, resulting in a uniform fruit size and quality and thus a higher grower income |
| | Often uneven development of the two scion branches of one tree, resulting in less optimal filling of the row volume, resulting in the need to correct this in subsequent years with cultural techniques such as pruning, implying increased costs for the grower | Balanced development of the at least two scion branches of one tree, resulting in better filling of the row volume and less need for correction in the orchard in subsequent years |
| Dominant single leader branch requires severe pruning throughout the orchard life time to achieve and maintain the desired tree architecture | | The lack of a dominant leader branch reduces the vigour and the need for corrective pruning throughout the orchard lifetime |

TABLE 1-continued

Advantages in the nursery of the method according to the invention for producing a nursery fruit tree of at least double trunk type and advantages in the orchard of the nursery fruit tree of at least double trunk type according to the invention, and comparison with prior art trees and methods for their production

| Prior art single leader tree (e.g. knip tree) | Prior art fruit tree plant of the double trunk type with an unbranched rootstock (e.g. as in WO 2008/047297) | Nursery fruit tree according to the invention |
| --- | --- | --- |
| | Only one contact zone between scions and the rootstock | Two rootstock-scion contact zones permit a more efficient transfer of rootstock properties (e.g. dwarfing, disease resistance) to the scion variety |
| Risk of biannual bearing | | Reduced risk of biannual bearing |
| High planting densities are required to fill up the orchard volume to achieve high fruit production in a short time | | Lower planting densities (roughly half of the density of single trunk tree orchards) are adequate to achieve high fruit productions in a short time. This greatly reduces orchard establishment costs. |
| Need for intensive pruning during the lifetime of the orchard to achieve and maintain productive trees | | Because of the balanced growth of the at least two scion branches of a tree, less pruning is required to maintain the desired tree and row architecture for optimal productivity |
| Labor-intensive because requires a lot of pruning | | Less pruning required and thus lower labor costs |
| Less open architecture of Knip trees reduces light penetration | | More open architecture of branched tree allows for better light penetration with beneficial effects on fruit colour and quality and on resilience of the tree towards biotic and abiotic stresses |

Those skilled in the art will recognize the many other effects and advantages of the present products, methods or uses, and the numerous possibilities for end uses (e.g., growers) of the present invention from the detailed description and examples provided below.

DETAILED DESCRIPTION OF THE PREFERRED EMBODIMENTS

Figure 1:
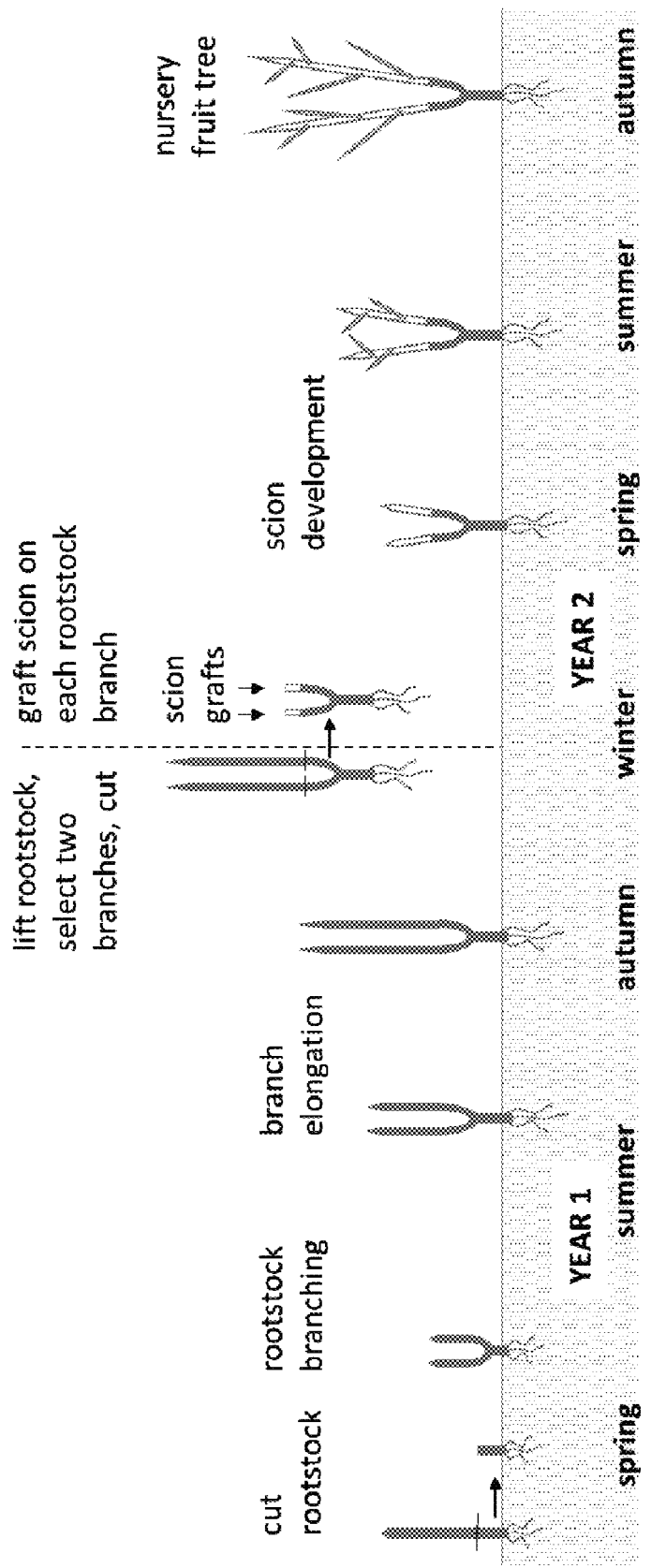
FIG. 1 represents a schematic representation of a method for producing a nursery fruit tree of the double trunk type according to an embodiment of the present invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms also encompass "consisting of" and "consisting essentially of", which enjoy well-established meanings in patent terminology.

The recitation of numerical ranges by endpoints includes all numbers and fractions subsumed within the respective ranges, as well as the recited endpoints.

The terms "about" or "approximately" as used herein when referring to a measurable value such as a parameter, an amount, a temporal duration, and the like, are meant to encompass variations of and from the specified value, such as variations of ±10% or less, preferably ±5% or less, more preferably ±1% or less, and still more preferably ±0.1% or less of and from the specified value, insofar such variations are appropriate to perform in the disclosed invention. It is to be understood that the value to which the modifier "about" refers is itself also specifically, and preferably, disclosed.

Whereas the terms "one or more" or "at least one", such as one or more members or at least one member of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members. In another example, "one or more" or "at least one" may refer to 1, 2, 3, 4, 5, 6, 7 or more.

The discussion of the background to the invention herein is included to explain the context of the invention. This is not to be taken as an admission that any of the material referred to was published, known, or part of the common general knowledge in any country as of the priority date of any of the claims.

Throughout this disclosure, various publications, patents and published patent specifications are referenced by an identifying citation. All documents cited in the present specification are hereby incorporated by reference in their entirety. In particular, the teachings or sections of such documents herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the invention. When specific terms are defined in connection with a particular aspect of the invention or a particular embodiment of the invention, such connotation is meant to apply throughout this specification, i.e., also in the context of other aspects or embodiments of the invention, unless otherwise defined.

In the following passages, different aspects or embodiments of the invention are defined in more detail. Each aspect or embodiment so defined may be combined with any other aspect(s) or embodiment(s) unless clearly indicated to the contrary. In particular, any feature indicated as being preferred or advantageous may be combined with any other feature or features indicated as being preferred or advantageous.

Reference throughout this specification to "one embodiment", "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The term "nursery" as used herein refers to a place where plants are propagated and grown to the size wherein the plants can be planted out for use, e.g., for fruit production, for example up to the sale to private persons or growers of commercial fruit orchards.

The term "nursery tree" as used herein refers to a young plant which has been propagated and raised in a nursery.

The term "proleptic shoots" refers to shoots that form out of buds that were formed the year before, i.e. after a dormant period.

The term "sylleptic shoots" refers to shoots that are formed directly from auxiliary buds without a period of dormancy.

The terms "knip tree" or "knipp tree" typically refer to a biannual tree obtained through grafting of a plant variety on a rootstock, growth of the plant in year one, and cutting back the stem at the end of the first year at about 50 to 80 cm, followed by promotion of the top bud in the next year to create a central leader on which sylleptic shoots form side branches.

The terms "rootstock" or "stock" as used herein refer to the plant part which has an established, healthy root system, onto which a scion (e.g., a cutting or a bud) from another plant variety can be grafted. The rootstock can be selected for its interaction with the soil, providing the roots and the stem to support the new plant, obtaining the necessary soil water and minerals, influencing size and architecture of the scion, and resisting the relevant pests and diseases.

The terms "scion" refers to the plant part which is grafted onto the rootstock. The scion can be selected for the properties that the propagator desires above-ground, including the photosynthetic activity and the fruit characteristics or decorative properties.

The term "grafting" as used herein refers to a horticultural technique whereby tissues of plants are joined so as to continue their growth together. Typically, the upper part of the combined plant is called the scion while the lower part is called the rootstock.

For example, in stem grafting, a common grafting method, a shoot of a selected, desired plant cultivar is grafted onto the stock of another type. In another common grafting method called bud grafting, a dormant side bud is grafted onto the stem of another stock plant, and when it has joined successfully, it is encouraged to grow by pruning off the stem of the stock plant just above the newly grafted bud.

The term "joint" as used herein refers to the connection formed between the grafted tissues, such as between a scion and a rootstock. Joints formed by grafting can be visually determined on a nursery fruit tree.

The term "calibre" as used herein refers to diameter.

As corroborated by the experimental section, which illustrates certain representative embodiments of the invention, the inventors realised that a nursery fruit tree comprising a branched rootstock containing at least two branches, each branch independently grafted with a scion, advantageously allows balanced development of the at least two scions, leading to similar and high fruit yields on both scion branches and consequently to a high overall fruit yield of the orchard.

Accordingly, an aspect relates to a nursery fruit tree of at least double trunk type, wherein the nursery fruit tree comprises a branched rootstock containing at least two branches, each branch grafted with a scion.

In certain embodiments of the nursery fruit trees or methods as taught herein, the nursery fruit tree of (the) at least double trunk type may be a nursery fruit tree of (the) double trunk type (so-called "bicaulis" tree). In certain embodiments, the nursery fruit tree of (the) at least double trunk type may be a nursery fruit tree of (the) multiple trunk type, such as a nursery fruit tree of (the) triple trunk type or a nursery fruit tree of (the) quadruple, quintuple or sextuple trunk type. Preferably, the nursery fruit tree of (the) at least double trunk type is a nursery fruit tree of (the) double trunk type.

In certain embodiments, the nursery fruit tree of at least double trunk type comprises a branched rootstock containing at least two branches, such as two or more branches, for instance three, four, five or six branches.

The terms "tree of (the) double trunk type", "double-trunk tree" or "bicaulis tree" may be used interchangeably herein.

The terms "tree of (the) triple trunk type" or "triple-trunk tree" may be used interchangeably herein.

In certain embodiments, the nursery fruit tree comprises a branched rootstock.

In certain embodiments of the nursery fruit trees or methods as taught herein, the branched rootstock may have a length of about 0.1 m (about 10 cm) to about 1 m (100 cm). In certain embodiments, the branched rootstock may have a length of about 0.1 m (about 10 cm) to about 0.8 m (about 80 cm), about 0.2 m (about 20 cm) to about 0.6 m (about 60 cm), or about 0.2 m (about 20 cm) to about 0.4 m (about 40 cm). For instance, the branched rootstock may have a length of about 0.1 m (about 10 cm), about 0.2 m (about 20 cm), about 0.3 m (about 30 cm), about 0.4 m (about 40 cm), about 0.5 m (about 50 cm), about 0.6 m (about 60 cm), about 0.7 m (about 70 cm), about 0.8 m (about 80 cm), about 0.9 m (about 90 cm) or about 1 m (about 100 cm).

The "length of the branched rootstock" as used herein refers to the average of the distances between the soil and each point of grafting (or joint) as measured along the rootstock. For a double-trunk tree, the average of the two distances is calculated. For a triple-trunk type tree, the average of the three distances is calculated.

The term "branched rootstock" as used herein refers to a rootstock comprising a trunk and at least two branches.

The terms "trunk" and "rootstock trunk" may be used interchangeably herein. The terms "branch" and "rootstock branch" may be used interchangeably herein.

In certain embodiments of the nursery fruit trees or methods as taught herein, the rootstock trunk may have a length of about 0.05 m (about 5 cm) to about 0.5 m (about 50 cm). In certain embodiments, the rootstock trunk may have a length of about 0.1 m (about 10 cm) to about 0.5 m (about 50 cm), about 0.1 m (about 10 cm) to about 0.4 m (about 40 cm), or about 0.2 m (about 20 cm) to about 0.4 m (about 40 cm). For instance, the rootstock trunk may have a length of about 0.1 m (about 10 cm), about 0.2 m (about 20 cm), about 0.3 m (about 30 cm), about 0.4 m (about 40 cm) or about 0.5 m (about 50 cm).

The "length of the rootstock trunk" as used herein refers to the distance between the soil and the point of branching (e.g., the bifurcation of a tree of the double-trunk type) as measured along the rootstock.

In certain embodiments of the nursery fruit trees or methods as taught herein, the rootstock branches may have a length of about 0.05 m (about 5 cm) to about 0.5 m (about 50 cm). In certain embodiments, the rootstock branches may have a length of about 0.1 m (about 10 cm) to about 0.5 m (about 50 cm), about 0.1 m (about 10 cm) to about 0.4 m (about 40 cm), or about 0.2 m (about 20 cm) to about 0.4 m (about 40 cm). For instance, the rootstock branches may have a length of about 0.1 m (about 10 cm), about 0.2 m (about 20 cm), about 0.3 m (about 30 cm), about 0.4 m (about 40 cm) or about 0.5 m (about 50 cm).

The "length of a rootstock branch" as used herein refers to the distance between the point of branching (e.g., the bifurcation) and the point of grafting (or joint) as measured along the rootstock.

In certain embodiments of the nursery fruit trees or methods as taught herein, the length of the at least two rootstock branches may be the same or different. Preferably, the length of the at least two rootstock branches is similar. In certain embodiments, the branched rootstock may comprise at least two similarly developed branches. Branched rootstocks comprising similarly developed rootstock branches advantageously improve the balanced development of the scion branches, and hence such branched rootstocks allow to obtain a nursery fruit tree with improved characteristics such as increased fruit yields and more uniform fruit size and fruit quality.

The wording "similarly developed" as used herein refers to having resemblance in development, such as for instance in calibre and length, without being necessarily identical.

In certain embodiments of the nursery fruit trees or methods as taught herein, the branched rootstock may be an apple variety (e.g. M9, M7, M26, MM106, MM109, MM111, Lancep, Cepiland, PI80, or Geneva) for the grafting of apple scions (i.e., scions of apple producing variety). In certain embodiments, the branched rootstock may be a pear variety (e.g. OHxF40, OHxF97, OHxF217 OHxF333, Pyrodwarf, BU3/33, BP1, BP3, or Pyriam), quince variety (e.g. Quince C, Quince A, Quince MA, Quince Adams, or BA29) or pear seedling variety (e.g. Kirchensaller) for the grafting of pear scions (i.e., scions of pear producing variety).

In certain embodiments, the branched rootstock may have a Y-shape.

In certain embodiments of the nursery fruit trees or methods as taught herein, the angle between two branches may be from 20 degrees to 135 degrees. In certain embodiments, the angle between two branches may be from 30 degrees to 135 degrees, from 40 degrees to 135 degrees, from 45 degrees to 135 degrees, from 50 degrees to 130 degrees, from 60 degrees to 120 degrees, from 70 degrees to 110 degrees, or from 80 degrees to 100. In certain embodiments, the angle between two branches may be from 45 degrees to 90 degrees or from 90 degrees to 135 degrees. Such angles advantageously allow uniform ripening of the fruits, resulting in uniform fruit size, colour and quality, and hence a higher grower income.

The angle between the rootstock branches can be measured at the point of branching.

In certain embodiments, each branch of the branched rootstock is grafted with a scion.

The terms "scion" and "scion branch" may be used interchangeably herein.

In certain embodiments of the nursery fruit trees or methods as taught herein, such as at the end of the nursery stage, the scion may have a length of about 0.4 m (about 40 cm) to about 2.9 m (about 290 cm). In certain embodiments, the scion may have a length of about 0.5 m (about 50 cm) to about 2.5 m (about 250 cm), about 1 m (about 100 cm) to about 2 m (about 200 cm), or about 1 m (about 100 cm) to about 1.5 m (about 150 cm). For instance, the scion may have a length of about 0.5 m (about 50 cm), about 0.75 m (about 75 cm), about 1 m (about 100 cm), about 1.25 m (about 125 cm), about 1.5 m (about 150 cm), about 2 m (about 200 cm), or about 2.5 m (about 250 cm). It will be understood by the skilled person that the nursery fruit tree, prior to being ready for sale, for instance immediately after grafting, may comprise scions having a length of less than about 0.4 m (about 40 cm), for instance of less than about 0.3 m (about 30 cm), less than about 0.2 m (about 20 cm), less than about 0.1 m (about 10 cm), or less than about 0.05 m (about 5 cm). In certain embodiments, immediately after grafting, the scion may have a length of about 2 cm to about 15 cm. In certain embodiments, at the grafting stage, the scion may be a shoot or twig, or may be a bud. In certain embodiments, immediately after grafting, the scion may contain one or more buds such as one, two or three buds. For instance, immediately after grafting, the scion may have a length of about 2 cm to about 15 cm and the scion may contain one, two or three buds.

The "length of a scion" or "length of the scion branch" as used herein refers to the longest distance between the point of grafting (or joint) and the top of the scion.

In certain embodiments, the length of the at least two scions may be the same or different. Preferably, the length of the at least two scions is similar. In certain embodiments, the at least two scions may be similarly developed. Similarly developed scions advantageously allow to obtain a nursery fruit tree with improved characteristics such as increased fruit yields and more uniform fruit size and fruit quality.

In certain embodiments, the scion may take the form of a whip, a spindle, a branch comprising diffusely positioned side-branches, a branch comprising discretely positioned side-branches with intersecting windows, or any other desired scion architecture.

In certain embodiments, the scion may be a non-cut scion branch with side branches that are diffusely positioned over the length of said scion branch, such side branches obtained during one or more growing seasons, i.e., a scion branch of type 1, as illustrated in FIG. 1.

In certain embodiments, the scion may be a scion branch without side branches or a scion whip, i.e., a scion branch of type 2.

In certain embodiments, the scion may be a scion branch obtained by cutting of said scion branch at the end of the first growing season after grafting at a point between 10 cm and 80 cm away from the grafting point, and allowing one bud to form a new branched scion shoot in the next one or more growing seasons, i.e., a scion branch of type 3.

In certain embodiments, the scion may be a scion branch with side branches positioned at discrete levels, e.g., interspaced by 'windows', such side branches obtained during one or more growing seasons, i.e., a scion branch of type 4.

In certain embodiments, the at least two scions may be scions of the same variety or may be scions of a different variety. Preferably, the at least two scions are scions of the same variety.

In certain embodiments of the nursery fruit trees or methods as taught herein, the scion may be a scion of a desired fruit producing variety. In certain embodiments, the desired fruit producing variety may be a hardwood fruit producing variety. In certain embodiments, the desired fruit producing variety may be a stone fruit producing variety or a pome fruit producing variety, such as an apple producing variety or a pear producing variety. For instance, apple producing varieties include Gala, Golden, Braeburn, Cripps Pink, Granny Smith, Jonagold, Elstar, Nicoter, Scifresh, Fuji, Red Delicious, Pinova, Nicoter, Empire, McIntosh, Honeycrisp, Inored, and Arianne. For instance, pear producing varieties include Conference, Williams or Bartlett, Doyenne du Comice, Abate Fetel, Packham, Anjou, Bosq, Beurre Hardy, Rocha, Guyot, Celina, Forelle, Starkrimson, and Seckel.

In certain embodiments of the nursery fruit trees or methods as taught herein, the scion may be a scion of an intermediate variety onto which a scion of a desired fruit producing variety is grafted. An intermediate variety may be an apple intermediate variety or pear intermediate variety. For instance, apple intermediate varieties include Gala, Golden, Braeburn, Cripps Pink, Granny Smith, Jonagold, Elstar, Nicoter, Scifresh, Fuji, Red Delicious, Pinova, Nicoter, Empire, McIntosh, Honeycrisp, Inored, and Arianne. For instance, pear intermediate varieties include Conference, Williams or Bartlett, Doyenne du Comice, Abate Fetel, Packham, Anjou, Bosq, Beurre Hardy, Rocha, Guyot, Celina, Forelle, Starkrimson, and Seckel.

In certain embodiments of the nursery fruit trees or methods as taught herein, such as at the end of the nursery stage, the nursery fruit tree may have a height of about 0.5 m (about 50 cm) to about 3 m (about 300 cm). In certain embodiments, the nursery fruit tree may have a height of about 0.5 m (about 50 cm) to about 2.5 m (about 250 cm). In certain embodiments, the nursery fruit tree may have a height of about 0.75 m (about 75 cm) to about 2.5 m (about 250 cm), about 1 m (about 100 cm) to about 2 m (about 200 cm), or about 1 m (about 100 cm) to about 1.5 m (about 150 cm). For instance, the nursery fruit tree may have a height of about 0.5 m (about 50 cm), about 0.75 m (about 75 cm), about 1 m (about 100 cm), about 1.25 m (about 125 cm), about 1.5 m (about 150 cm), about 2 m (about 200 cm), or about 2.5 m (about 250 cm). It will be understood by the skilled person that the nursery fruit tree prior to the end of the nursery stage, for instance immediately after grafting, may have a height of less than about 0.5 m (about 50 cm), for instance of less than about 0.4 m (about 40 cm), less than about 0.3 m (about 30 cm), or less than about 0.2 m (about 20 cm). For instance, immediately after grafting, the nursery fruit tree may have a height of about 0.12 m (about 12 cm) to about 1.15 m (about 115 cm).

The "height of the nursery fruit tree" as used herein refers to the distance between the soil and the top of the nursery fruit tree as measured perpendicular to the plane of the soil.

In certain embodiments, the nursery fruit tree may have the following characteristics:
- the branched rootstock has a length of about 0.1 m to about 1 m;
- the scions have a length of about 0.4 m to about 2.9 m; and
- the nursery fruit tree has a height of about 0.5 m to about 3 m.

In certain embodiments, the nursery fruit tree may have the following characteristics:
- the rootstock trunk has a length of about 0.05 m to about 0.5 m;
- the rootstock branches have a length of about 0.05 m to about 0.5 m;
- the scions have a length of about 0.4 m to about 2.9 m; and
- the nursery fruit tree has a height of about 0.5 m to about 3 m.

In certain embodiments, the nursery fruit tree may comprise, on each rootstock branch, a non-cut scion branch with side branches that are diffusely positioned over the length of said scion branch, such side branches obtained during one or more growing seasons, i.e., a scion branch of type 1, as illustrated in FIG. 1.

In certain embodiments, the nursery fruit tree may comprise, on each rootstock branch, a scion branch without side branches (or a scion whip), i.e., a scion branch of type 2.

In certain embodiments, the nursery fruit tree may comprise, on each rootstock branch, a scion branch obtained by cutting of said scion branch at the end of the first growing season after grafting at a point between 10 cm and 80 cm away from the grafting point, and allowing one bud to form a new branched scion shoot in the next one or more growing seasons, i.e., a scion branch of type 3.

In certain embodiments, the nursery fruit tree may comprise, on each rootstock branch, a scion branch with side branches positioned at discrete levels, e.g., interspaced by 'windows', such side branches obtained during one or more growing seasons, i.e., a scion branch of type 4.

In certain embodiments, the nursery fruit tree as taught herein may comprise a combination of scion branches of type 1, type 2, type 3 and type 4. For instance, a nursery fruit tree of double trunk type may comprise a scion branch of type 1 and a scion branch of type 2, a scion branch of type 1 and a scion branch of type 3, a scion branch of type 1 and scion branch of type 4, a scion branch of type 2 and a scion branch of type 3, a scion branch of type 2 and a scion branch of type 4, or a scion branch of type 3 and a scion branch of type 4.

At least four different main types of finished or ready-for-sale nursery fruit trees can be described. Types with mixed features of these four main types are also possible.

A nursery fruit tree of double trunk type according to a first embodiment of the invention may have the following characteristics ("nursery fruit tree, type 1"):
- height of the nursery fruit tree between 0.5 m and 3 m;
- length of the scion branches between 0.4 m and 2.9 m;
- length of the rootstock trunk between 5 cm and 50 cm;
- length of the rootstock branches between 5 cm and 50 cm;

angle between the rootstock branches between 20 degrees and 135 degrees; and on each rootstock branch, a non-cut scion branch with side branches that are diffusely positioned over the length of said scion branch, such side branches obtained during one or more growing seasons.

A nursery fruit tree of double trunk type according to a second embodiment of the invention may have the following characteristics ("nursery fruit tree, type 2"):

height of the nursery fruit tree between 0.5 m and 3 m;
length of the scion branches between 0.4 m and 2.9 m;
length of the rootstock trunk between 5 cm and 50 cm;
length of the rootstock branches between 5 cm and 50 cm;
angle between the rootstock branches between 20 degrees and 135 degrees; and on each rootstock branch, a scion branch without side branches (scion whips).

A nursery fruit tree of double trunk type according to a third embodiment of the invention may have the following characteristics ("nursery fruit tree, type 3"):

height of the nursery fruit tree between 0.5 m and 3 m;
length of the scion branches between 0.4 m and 2.9 m;
length of the rootstock trunk between 5 cm and 50 cm;
length of the rootstock branches between 5 cm and 50 cm;
angle between the rootstock branches between 20 degrees and 135 degrees; and on each rootstock branch, a scion branch obtained by cutting of said scion branch at the end of the first growing season after grafting at a point between 10 and 80 cm away from the grafting point and allowing one bud to form a new branched scion shoot in the next one or more growing seasons (obtained by "knip tree" method).

A nursery fruit tree of double trunk type according to a second embodiment of the invention may have the following characteristics ("nursery fruit tree, type 4"):

height of the nursery fruit tree between 0.5 m and 3 m;
length of the scion branches between 0.4 m and 2.9 m;
length of the rootstock trunk between 5 cm and 50 cm;
length of the rootstock branches between 5 cm and 50 cm;
angle between the rootstock branches between 20 degrees and 135 degrees; and on each rootstock branch, a scion branch with side branches positioned at discrete levels, interspaced by 'windows', such side branches obtained during one or more growing seasons.

In certain embodiments of the nursery fruit trees or methods as taught herein, the nursery fruit tree may be a hardwood fruit tree. In certain embodiments of the nursery fruit trees or methods as taught herein, the nursery fruit tree may be a hardwood fruit tree selected from an apple tree, a pear tree, a quince tree, a plum tree, a cherry tree, a sour cherry tree, a peach tree, a nectarine tree, an apricot tree, or a tree resulting from interspecific hybridisation (e.g., by cross-breeding) of two or more species selected from the group consisting of apricot, plum, cherry, sour cherry, peach, and nectarine.

Preferably, the nursery fruit tree may be a tree producing pome fruit such as apple, pear or quince, or a tree producing stone fruit, such as plum, cherry, sour cherry, peach, nectarine, apricot, or a hybrid thereof.

The terms "tree producing pome fruit", "pome fruit producing tree" or "pome fruit tree" may be used interchangeably. Examples of pome fruit trees are apple trees, pear trees or quince trees.

The terms "tree producing stone fruit", "stone fruit producing tree" or "stone fruit tree" may be used interchangeably. Examples of stone fruit trees are plum trees, cherry trees, sour cherry trees, peach trees, nectarine trees, apricot trees, or trees that are the result of interspecific hybridisation (i.e., genomic hydride) of two or more species selected from the group consisting of apricot, plum, cherry, sour cherry, peach, and nectarine.

A further aspect relates to a fruit tree grown from a nursery fruit tree as taught herein. The fruit tree may be grown from a nursery fruit tree as taught herein for one or more years, for instance in an orchard.

A further aspect relates to a method for producing a nursery fruit tree of at least double trunk type, comprising the steps of:

(a) providing a rootstock;
(b) producing a branched rootstock containing at least two branches, and
(c) grafting a scion on each branch of the branched rootstock, thereby obtaining a nursery fruit tree of at least double trunk type.

In certain embodiments, the methods as taught herein comprise step (a) of providing a rootstock. The rootstock can be produced on a field by any established method for propagation such as hardwood cutting, seedlings, mound layering (or stooling), trench layering, or micropropagation. For instance, seedlings may be grown from seeds of a variety that is relatively true-to-type (meaning that all the seedlings have similar characteristics, e.g. Kirchensaller).

In certain embodiments, the rootstock provided in step (a) may be produced by hardwood cutting, mound layering, trench layering, or micropropagation.

In certain embodiments, the methods as taught herein comprise step (b) of producing a branched rootstock containing at least two branches. Producing a branched rootstock containing at least two branches advantageously allows to produce nursery fruit trees with balanced development of the two scion branches leading to similar and high fruit yields on both scion branches, resulting in uniform fruit size and quality, and resulting in better filing of the row volume in the orchard.

In certain embodiments, the branched rootstock of step (b) may be produced by:

(a') cutting back the rootstock;
(b') optionally influencing the degree of branching and/or the position of the branches by one or more techniques selected from the group consisting of pruning, pinching, cutting, and applying growth regulating substances; and
(c') growing a rootstock containing at least two branches, thereby obtaining a branched rootstock containing at least two branches.

In certain embodiments, producing the branched rootstock may further comprise (d') selecting a branched rootstock containing the desired number of branches (i.e., at least two branches, e.g. two branches), or producing a branched rootstock with the desired number of branches (i.e., at least two branches, e.g. two branches) by removing excessive branches by pruning, pinching or cutting.

In certain embodiments, the branched rootstock may be produced by cutting back a rootstock. Cutting back a rootstock advantageously allows branching of the rootstock.

In certain embodiments, step (a') may be performed manually or mechanically. Preferably, step (a') is performed in spring. The indication of the timing of the method steps is illustrative and refers to the rate of seasons (i.e., spring, summer, autumn, winter). Unless mentioned otherwise, chronologically listed seasons refer to chronologically successive seasons in the same growing season or year.

In certain embodiments, the methods as taught herein comprise growing the rootstock, e.g., on the field. In certain embodiments, after cutting back the rootstock, new sprouts occur on the resulting plants. The number of sprouts may vary between one, two or more. The degree of sprouting and/or the position of the sprouts may be manipulated by employing techniques generally known in the art such as pruning, pinching, cutting, and applying growth regulating substances, for instance, immediately after cutting back the rootstock or during growth of the rootstock.

In certain embodiments, the growth regulating substance may be one or more of a growth inhibitor, a growth inducer and a branching agent.

In certain embodiments, the growth regulating substance may be one or more growth inhibitors selected from the group consisting of prohexadione-Ca (cyclohexanecarboxylic acid, 3,5-dioxo-4-(1-oxopropyl)-ion(1-) calcium), ethrel (2-chloroethylphosphonic acid), naphthaleneacetic acid (NAA), butraline (N-sec-butyl-4-tertbutyl-2,6-dinitro-aniline), chlormequat (2-chloroethyltrimethyl-ammonium chloride), daminoside (succinic acid, mono(2,2-dimethylhydrazide)), and paclobutrazol (1-(4-chlorophenyl)-4,4-dimethyl-2-(1H-1,2,4-triazol-1-yl)-3-pentanol).

In certain embodiments, the growth regulating substance may be one or more growth inducers and/or branching agents selected from the group consisting of gibberellic acid (e.g. GA4, GA7), 6-benzylaminopurine (BA), N,N'-diphenylurea (DPU), maleic hydrazide (1,2-dihydropyridazine-3,6-dione), propyl [3-(1,1-dimethylethyl)phenoxy]acetate (M&B 25-105), ((3-phenyl-1,2,4-thiadiazol-5-yl)thio)acetic acid (NC9634), Off-Shoot-O (mixture of methyl esters of fatty acids), PP528 (ethyl-5-(4-chlorophenyl)-2H-tetrazol-2-yl-acetate), and dyallyl-succinate (PP938).

In certain embodiments, the growth regulating substance may be selected from the group consisting of auxins, cytokinins, ethylene inhibitors (like aviglycine, 1-methylcyclopropene), ethylene releasers (like ACC, etacelasil, ethephon, glyoxime), gibberellins, antiauxins (like clofibric acid, 2,3,5-triiodobenzoic acid), defoliants (like calcium cyanamide, dimethipin, endothall, ethephon merphos, metoxuron, pentachlorophenol, 1 thidiazuron, tribufos), growth inhibitors (like abscisic acid, ancymidol, butralin, carbaryl, chlorphonium, chlorpropham, dikegulac, flumetralin, fluoridamid, fosamine, glyphosine, isopyrimol, jasmonic acid, mepiquat, piproctanyl, prohydrojasmon, propham, tiaojiean, 2,3,5-triiodobenzoic acid), morphactins (like chlorfluren, chlorflurenol, dichlorflurenol, flurenol), growth retardants (like daminozide, flurprimidol, mefluidide, tetcyclacis, uniconazole), growth stimulators (like brassinolide, brassinolide-ethyl, DCPTA, forchlorfenuron, hymexazol, psoralen, pyripropanol, triacontanol), bachmedesh, benzofluor, buminafos, carvone, choline, chloride, ciobutide, clofencet, cloxyfonac, cyanamide, cyclanilide, cycloheximide, cyprosulfamide, epocholeone, ethychlozate, ethylene, fuphenthiourea, furalane, heptopargil, holosulf, inabenfide, karetazan, lead, arsenate, methasulfocarb, pydanon, sintofen, triapenthenol, and trinexapac.

In certain embodiments, the growth regulating substance may be any naturally derived or synthetic substance capable of altering the architecture of plants.

Sprouts on the rootstock will develop into branches. Rootstocks containing two branches can be used for producing double-trunk trees. Non-branched rootstocks can be used for the production of single-trunk fruit trees such as knip trees. Rootstocks containing more than two branches can be used for producing multiple-trunk fruit trees. Rootstocks containing more than two branches can be pruned to contain two branches for the production of double-trunk trees.

In certain embodiments, the order of steps (b') and (c') can be reversed.

In certain embodiments, step (a') may be performed in spring, and steps (b') and (c') may be performed in the remainder of the growing season, and optionally for more than one growing season.

In certain embodiments, prior to grafting, producing the branched rootstock may further comprise (d') selecting a branched rootstock containing the desired number of branches (i.e., at least two, e.g. two branches), and/or producing a branched rootstock with the desired number of branches (i.e., at least two, e.g. two branches) by removing excessive branches for instance by pruning, pinching or cutting.

In certain embodiments, the method may comprise selecting a branched rootstock containing at least two similarly developed branches. This advantageously improves the balanced growth of the scion branches of the nursery fruit tree, thereby increasing fruit yields.

In certain embodiments, the methods as taught herein may comprise, prior to grafting, the step of cutting the rootstock branches.

In certain embodiments, the methods as taught herein comprise step (c) of grafting a scion on each branch of the branched rootstock, thereby obtaining a nursery fruit tree of at least double trunk type.

In certain embodiments, the grafting in step (c) may be performed on the branched rootstock which is growing or on the branched rootstock which is dormant. In certain embodiments, the grafting in step (c) may be performed on the branched rootstock in the field or on the branched rootstock lifted from the field (so-called "bench-grafting"). In certain embodiments, the grafting in step (c) may be performed on the dormant branched rootstock lifted from the field.

In certain embodiments, the grafting in step (c) is performed by a technique selected from the group consisting of whip-and-tongue grafting, double-tongue grafting, simple English grafting, complicated or double English grafting, splice grafting, T-grafting, V-grafting, W-grafting, side grafting, side-veneer grafting, cleft grafting, saddle grafting, bark grafting (veneer grafting), omega-grafting, chip-budding, occulation, stub grafting, shield budding, T-budding, inverted T-budding, patch budding, double shield budding, and flute budding.

In certain embodiments of the methods as taught herein, cutting back the rootstock may be performed in spring, and grafting may be performed in autumn or winter.

In certain embodiments of the methods as taught herein, cutting back the rootstock may be performed in spring, the branched rootstock may be lifted from the field in autumn, and grafting may be performed in winter.

In certain embodiments of the methods as taught herein, cutting back the rootstock may be performed in spring, and grafting may be performed on the branched rootstock standing in the field in autumn of the same year or in spring of the next year.

In certain embodiments of the methods as taught herein, grafting may be performed in vitro.

In certain embodiments of the methods as taught herein, grafting may be performed on the branched rootstock that has been growing for more than one year.

In certain embodiments of the methods as taught herein, grafting of scions of an intermediate variety on the branched rootstock, followed by or concomitant with grafting on these scions of scions of a desired fruit variety may be performed to produce inter-stem trees (i.e., trees producing fruit of the desired variety on scions of that variety which are connected to the rootstock by an intermediate variety). Such interstem trees are advantageously used for overcoming scion-rootstock incompatibility.

In certain embodiments, the joints formed by grafting a scion on each branch of the branched rootstock (in step (c)) can be visually determined on the nursery fruit tree.

In certain embodiments, the methods as taught herein may comprise the further step (d) of growing the nursery fruit tree of at least double trunk type until the nursery fruit tree can be planted out for fruit production.

In certain embodiments of the methods as taught herein, the growing step (d) may comprise influencing architecture of the scions by one or more techniques selected from the group consisting of pruning, pinching, cutting, and applying one or more growth regulating substances as described herein.

A further aspect relates to a nursery fruit tree obtainable by the methods as taught herein.

The present application also provides aspects and embodiments as set forth in the following Statements:

Statement 1. A nursery fruit tree of at least double trunk type, wherein the nursery fruit tree comprises a branched rootstock containing at least two branches, each branch grafted with a scion.

Statement 2. The nursery fruit tree according to statement 1, wherein the nursery fruit tree has the following characteristics:
the branched rootstock has a length of about 0.1 m to about 1 m;
the scions have a length of about 0.4 m to about 2.9 m; and
the nursery fruit tree has a height of about 0.5 m to about 3 m.

Statement 3. The nursery fruit tree according to statement 1 or 2, wherein the angle between two branches is from 20 degrees to 135 degrees.

Statement 4. The nursery fruit tree according to any one of statements 1 to 3, wherein the nursery fruit tree is a hardwood fruit tree, preferably wherein the nursery fruit tree is a tree producing pome fruit such as apple, pear or quince, or a tree producing stone fruit such as plum, cherry, sour cherry, peach, nectarine, apricot, or a hybrid thereof.

Statement 5. A fruit tree grown from a nursery fruit tree according to any one of statements 1 to 4.

Statement 6. A method for producing a nursery fruit tree of at least double trunk type, comprising the steps of: (a) providing a rootstock; (b) producing a branched rootstock containing at least two branches, and (c) grafting a scion on each branch of the branched rootstock, thereby obtaining a nursery fruit tree of at least double trunk type.

Statement 7. The method according to statement 6, wherein the branched rootstock of step (b) is produced by: (a') cutting back the rootstock; (b') optionally influencing the degree of branching and/or the position of the branches by one or more techniques selected from the group consisting of pruning, pinching, cutting, and applying growth regulating substances; and (c') growing a rootstock containing at least two branches, thereby obtaining a branched rootstock containing at least two branches.

Statement 8. The method according to statement 7, wherein step (a') is performed in spring, and steps (b') and (c') are performed in the remainder of the growing season and optionally for more than one growing season.

Statement 9. The method according to any one of statements 6 to 8, wherein the rootstock provided in step (a) is produced by hardwood cutting, mound layering, trench layering, or micropropagation.

Statement 10. The method according to any one of statements 6 to 9, wherein the grafting in step (c) is performed on the branched rootstock which is growing or on the branched rootstock which is dormant; and/or wherein the grafting in step (c) is performed on the branched rootstock in the field or on the branched rootstock lifted from the field.

Statement 11. The method according to any one of statements 6 to 10, wherein the grafting in step (c) is performed by a technique selected from the group consisting of whip-and-tongue grafting, double-tongue grafting, simple English grafting, complicated or double English grafting, splice grafting, T-grafting, V-grafting, W-grafting, side grafting, side-veneer grafting, cleft grafting, saddle grafting, bark grafting (veneer grafting), omega-grafting, chip-budding, occulation, stub grafting, shield budding, T-budding, inverted T-budding, patch budding, double shield budding, and flute budding.

Statement 12. The method according to any one of statements 6 to 11, wherein:
cutting back the rootstock is performed in spring, and grafting is performed in autumn or winter;
cutting back the rootstock is performed in spring, the branched rootstock is lifted from the field in autumn, and grafting is performed in winter;
cutting back the rootstock is performed in spring, and grafting is performed on the branched rootstock standing in the field in autumn of the same year or in spring of the next year;
grafting is performed in vitro; and/or
grafting is performed on the branched rootstock that has been growing for more than one year.

Statement 13. The method according to any one of statements 6 to 12, comprising the further step (d) of growing the nursery fruit tree of at least double trunk type until the nursery fruit tree can be planted out for fruit production, preferably wherein the growing step (d) comprises influencing architecture of the scions by one or more techniques selected from the group consisting of pruning, pinching, cutting, and applying one or more growth regulating substances.

Statement 14. The method according to any one of statements 6 to 13, wherein the nursery fruit tree is a hardwood fruit tree, preferably wherein the nursery fruit tree is a tree producing pome fruit such as apple, pear or quince, or a tree producing stone fruit such as plum, cherry, sour cherry, peach, nectarine, apricot, or a hybrid thereof.

Statement 15. A nursery fruit tree obtainable by the method according to any one of statements 6 to 14.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as follows in the spirit and broad scope of the appended claims.

The herein disclosed aspects and embodiments of the invention are further supported by the following non-limiting examples.

EXAMPLES

Example 1: Method for Producing a Nursery Fruit Tree of Double Trunk Type According to an Embodiment of the Present Invention An exemplary method for obtaining a nursery fruit tree of double trunk type according to an embodiment of the present invention started from a commercially obtained rootstock of the variety M9 produced by layering.

In spring of the first growing season (FIG. 1, year 1), the field grown rootstock was cut back manually (FIG. 1, cut rootstock). On the resulting plant, new sprouts occurred (FIG. 1, rootstock branching). The number of sprouts per rootstock varied between one, two or more. The degree of sprouting and the position of the sprouts was manipulated by employing one or more techniques generally known in the art such as pruning, pinching, cutting, and applying growth regulating substances such as those listed herein.

During the remainder of the first growing season, sprouts developed into branches (FIG. 1, branch elongation).

At the end of the first growing season, branched rootstocks were lifted from the field (FIG. 1, lift rootstock) and used for grafting in winter (bench-grafting). Rootstocks containing two branches were used for producing double-trunk trees according to an embodiment of the invention (FIG. 1, select two branches). Rootstocks containing more than two branches were pruned during the growing season and, if required, again after lifting from the field, to contain two branches for the production of double-trunk trees according to an embodiment of the invention. Alternatively, rootstocks containing more than two branches could have been used for producing multiple-trunk fruit trees according to an embodiment of the invention. Non-branched rootstocks were used for the production of single-trunk fruit trees such as for example knip trees.

The branches were cut (FIG. 1, cut) and a scion shoot of the desired apple cultivar, i.e., Golden or Gala, (FIG. 1, scion grafts) was grafted onto each branch of the branched rootstock by double English grafting (FIG. 1, graft scion on each rootstock branch). Grafting could also have been done using one of the various other techniques known in the art, such as whip-and-tongue grafting, double-tongue grafting, simple English grafting, splice grafting, T-grafting, V-grafting, W-grafting, side grafting, side-veneer grafting, cleft grafting, saddle grafting, bark grafting (veneer grafting), splice grafting, omega-grafting, chip-budding, occulation, stub grafting, shield budding, T-budding, inverted T-budding, patch budding, double shield budding, and flute budding.

Nursery fruit trees produced according to the above-described method steps were then further grown in the field during the second growing season (FIG. 1, year 2, scion development). The scion branches were formed to obtain the desired architecture (e.g. length, inclination, number of side branches, calibre) by techniques generally known in the art such as pruning, pinching, cutting and/or the application of growth regulating substances such as those provided herein.

The method resulted in ready-to-use nursery fruit trees of the double trunk type according to an embodiment of the present invention ("nursery fruit tree, type 1"), characterized in that the nursery fruit tree had a height of about 0.5 m to about 3 m; the rootstock trunk had a length of about 5 cm to about 50 cm; the rootstock branches had a length of about 5 cm to about 50 cm; the scions had a length of about 0.4 m to about 2.9 m; the angle between the branches was from 20 degrees to 135 degrees; and each rootstock branch comprised a non-cut scion branch with side branches that were diffusely positioned over the length of said scion branch, the side branches obtained during the second growing season, as depicted in FIG. 1.

The nursery fruit trees of the double trunk type can be lifted from the field and sold in autumn or winter of the second growing season or spring of the next growing season, but it is also possible to continue growing the nursery fruit trees for several seasons to obtain a tree of the desired size, calibre and architecture.

The invention claimed is:

1. A nursery fruit tree of at least double trunk type, wherein the nursery fruit tree is a hardwood fruit tree, and wherein the nursery fruit tree comprises a branched rootstock containing at least two branches, each branch grafted with a scion, wherein the at least two scions are scions of the same variety.

2. The nursery fruit tree according of claim 1,
wherein the branched rootstock has a length of about 0.1 m to about 1 m;
wherein each of the scions have a length of about 0.4 m to about 2.9 m; and
wherein the nursery fruit tree has a height of about 0.5 m to about 3 m.

3. The nursery fruit tree of claim 1, wherein the angle between two of the least two branches is from 20 degrees to 135 degrees.

4. The nursery fruit tree of claim 1, wherein the nursery fruit tree is a hardwood fruit tree selected from an apple tree, a pear tree, a quince tree, a plum tree, a cherry tree, a sour cherry tree, a peach tree, a nectarine tree, an apricot tree, or a tree resulting from interspecific hybridisation of two or more species selected from the group consisting of apricot, plum, cherry, sour cherry, peach, and nectarine.

5. A fruit tree grown from the nursery fruit tree of claim 1.

6. A method for producing the nursery fruit tree of claim 1, the method comprising:
producing a branched rootstock containing at least two branches, and
grafting a scion on each branch of the branched rootstock, wherein the at least two scions are scions of the same hardwood fruit producing variety, thereby obtaining the nursery fruit tree of claim 1.

7. The method according to claim 6, wherein the branched rootstock of is produced by:
cutting back a rootstock;
and
growing a rootstock containing at least two branches, thereby obtaining a branched rootstock containing at least two branches.

8. The method according to claim 7, wherein cutting back the rootstock is performed in spring, and growing the rootstock containing at least two branches performed in the remainder of the growing season.

9. The method according to claim 6, wherein the rootstock used to produce the branched rootstock is produced by hardwood cutting, mound layering, trench layering, or micropropagation.

10. The method according to claim 6, wherein the grafting is performed on the branched rootstock which is growing or on the branched rootstock which is dormant; and/or wherein the grafting is performed on the branched rootstock in the field or on the branched rootstock lifted from the field.

11. The method according to claim 6, wherein the grafting is performed by a technique selected from the group consisting of whip-and-tongue grafting, double-tongue grafting, simple English grafting, complicated or double English grafting, splice grafting, T-grafting, V-grafting, W-grafting, side grafting, side-veneer grafting, cleft grafting, saddle grafting, bark grafting (veneer grafting), omega-grafting, chip-budding, occulation, stub grafting, shield budding, T-budding, inverted T-budding, patch budding, double shield budding, and flute budding.

12. The method according to claim 7,
wherein:
   cutting back the rootstock is performed in spring, and grafting is performed in autumn or winter;
   cutting back the rootstock is performed in spring, the branched rootstock is lifted from the field in autumn, and grafting is performed in winter; or
   cutting back the rootstock is performed in spring, and grafting is performed on the branched rootstock standing in the field in autumn of the same year or in spring of the next year; and
   wherein grafting is performed in vitro; and/or grafting is performed on the branched rootstock that has been growing for more than one year.

13. The method according to claim 6, the method further comprising growing the nursery fruit tree of at least double trunk type until the nursery fruit tree can be planted out for fruit production.

14. The method according to claim 6, wherein the nursery fruit tree is a hardwood fruit tree selected from an apple tree, a pear tree, a quince tree, a plum tree, a cherry tree, a sour cherry tree, a peach tree, a nectarine tree, an apricot tree, or a tree resulting from interspecific hybridisation of two or more species selected from the group consisting of apricot, plum, cherry, sour cherry, peach, and nectarine.

15. The method according to claim 7, further comprising influencing the degree of branching and/or the position of the branches by one or more techniques selected from the group consisting of pruning, pinching, cutting, and applying growth regulating substances.

16. The method according to claim 8, further comprising growing the rootstock containing at least two branches for more than one growing season.

17. The method according to claim 13, wherein the growing comprises influencing architecture of the scions by one or more techniques selected from the group consisting of pruning, pinching, cutting, and applying one or more growth regulating substances.

* * * * *